United States Patent
Han et al.

(10) Patent No.: US 9,799,874 B2
(45) Date of Patent: Oct. 24, 2017

(54) RECHARGEABLE BATTERY

(71) Applicant: SAMSUNG SDI CO., LTD., Yongin-si, Gyeonggi-do (KR)

(72) Inventors: Min-Yeol Han, Yongin-si (KR); Sang-Won Byun, Yongin-si (KR); Hae-Kwon Yoon, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 21 days.

(21) Appl. No.: 14/177,357

(22) Filed: Feb. 11, 2014

(65) Prior Publication Data

US 2015/0010805 A1 Jan. 8, 2015

(30) Foreign Application Priority Data

Jul. 2, 2013 (KR) .................. 10-2013-0077373

(51) Int. Cl.
  *H01M 2/26* (2006.01)
  *H01M 2/30* (2006.01)
  *H01M 10/04* (2006.01)
  *H01M 2/22* (2006.01)

(52) U.S. Cl.
  CPC ............ *H01M 2/263* (2013.01); *H01M 2/22* (2013.01); *H01M 2/30* (2013.01); *H01M 10/0431* (2013.01)

(58) Field of Classification Search
  CPC ........ H01M 2/26; H01M 10/043; H01M 2/22; H01M 2/263; H01M 2/30
  USPC ........................................................ 429/149
  See application file for complete search history.

(56) References Cited

U.S. PATENT DOCUMENTS

| 2011/0008670 | A1 | 1/2011 | Han et al. | |
| 2011/0171516 | A1* | 7/2011 | Byun | ............... H01M 2/263 429/161 |
| 2012/0107655 | A1 | 5/2012 | Lee | |
| 2012/0196166 | A1 | 8/2012 | Kim | |

(Continued)

FOREIGN PATENT DOCUMENTS

| JP | 2011-146379 A | | 7/2011 | |
| KR | 1020040054201 A | * | 6/2004 | ............ H01M 10/04 |

(Continued)

OTHER PUBLICATIONS

Machine Translation KR1020040054201A.*

(Continued)

*Primary Examiner* — Helen O. K. Conley
*Assistant Examiner* — Victoria Lynch
(74) *Attorney, Agent, or Firm* — Lee & Morse, P.C.

(57) ABSTRACT

A rechargeable battery includes at least two electrode assemblies including electrodes on opposite surfaces of a separator, a case accommodating the electrode assemblies, a cap plate coupled to an opening of the case, first and second electrode terminals in the cap plate, and first and second lead tabs connected to respective first and second electrode terminals and to respective uncoated regions of the two electrode assemblies, wherein a first uncoated region of each of the two electrode assemblies is at a center of the case and is connected to the first lead tab, and wherein a second uncoated region of each of the two electrode assemblies is at an edge of the case and is connected to the second lead tab.

17 Claims, 13 Drawing Sheets

(56) References Cited

U.S. PATENT DOCUMENTS

| | | | |
|---|---|---|---|
| 2012/0202106 A1 | 8/2012 | Byun et al. | |
| 2012/0258342 A1* | 10/2012 | Tstsumi | H01G 11/66 |
| | | | 429/94 |
| 2013/0040191 A1* | 2/2013 | Kim | H01M 2/22 |
| | | | 429/179 |
| 2013/0095372 A1* | 4/2013 | Kim | H01M 2/18 |
| | | | 429/178 |

FOREIGN PATENT DOCUMENTS

| | | |
|---|---|---|
| KR | 10-2011-0005595 A | 1/2011 |
| KR | 10-2012-0046000 A | 5/2012 |
| KR | 10-2012-0086835 A | 8/2012 |
| KR | 10-2013-0016746 A | 2/2013 |
| KR | 10-2013-0040114 A | 4/2013 |
| KR | 10-1275785 B1 | 6/2013 |
| WO | WO 2012/023392 A1 | 2/2012 |

OTHER PUBLICATIONS

Korean Office Action dated Jul. 20, 2016.
Korean Office Action dated Jan. 24, 2017 of the corresponding Korean Patent Application No. 10-2013-0077373.
Korean Notice of Allowance dated Jul. 29, 2017 of the corresponding Korean Patent Application No. 10-2013-0077373.

\* cited by examiner

RECHARGEABLE BATTERY

CROSS-REFERENCE TO RELATED APPLICATION

Korean Patent Application No. 10-2013-0077373, filed on Jul. 2, 2013, in the Korean Intellectual Property Office, and entitled: "Rechargeable Battery," is incorporated by reference herein in its entirety.

BACKGROUND

1. Field

The present disclosure relates to a rechargeable battery manufactured by connecting a plurality of electrode assemblies in parallel and installing them in a case.

2. Description of the Related Art

A rechargeable battery is a battery that can be repeatedly charged and discharged, unlike a primary battery. A low-capacity rechargeable battery may be used for small portable electronic devices, e.g., a mobile phone, a notebook computer, and a camcorder, and a large-capacity rechargeable battery may be used as a power supply for driving a motor, e.g., a hybrid car.

For example, a rechargeable battery may include an electrode assembly for performing charging and discharging operations, a case accommodating the electrode assembly, a cap plate coupled to an opening of the case, and a lead tab for electrically connecting the electrode assembly to an electrode terminal installed in the cap plate. To accomplish high capacity, the rechargeable battery may be manufactured by connecting a plurality of electrode assemblies in parallel and installing them in a case.

For example, negative uncoated regions of the electrode assemblies may be disposed at an upper side of the case, and positive electrode uncoated regions thereof may be disposed at a lower side thereof. Further, each of the uncoated regions may be connected to a lead tab.

SUMMARY

The described technology has been made in an effort to provide a rechargeable battery having advantages of accomplishing high capacity and stability by connecting a plurality of electrode assemblies and accommodating them in a case.

An exemplary embodiment provides a rechargeable battery including at least two electrode assemblies, each one of the at least two electrode assemblies including electrodes on opposite surfaces of a separator, a case configured to accommodate the at least two electrode assemblies therein, a cap plate coupled to an opening of the case, a first electrode terminal and a second electrode terminal installed in the cap plate, and a first lead tab and a second lead tab connected to the first electrode terminal and the second electrode terminal, respectively, the first and second lead tabs being connected to uncoated regions of each of the at least two electrode assemblies, wherein the uncoated regions of each of the at least two electrode assemblies include a first uncoated region and a second uncoated regions, wherein the first uncoated region of each of the at least two electrode assemblies is disposed at a center of the case, the first uncoated region of each of the at least two electrode assemblies being connected to the first lead tab, and wherein the second uncoated region of each of the at least two electrode assemblies is at an edge of the case, the second uncoated regions of each of the at least two electrode assemblies being connected to the second lead tab.

The first lead tab may include a first adhered portion disposed at the center of the case to be adhered to the first uncoated region of each of the at least two electrode assemblies, and a first coupled portion bent from the first adhered portion to be coupled to the first electrode terminal.

The second lead tab may include a pair of second adhered portions disposed at opposite edges of the case to be adhered to the second uncoated region of each of the at least two electrode assemblies, a connected portion disposed and bent between the case and each of the at least two electrode assemblies, the connected portion being at an opposite side of the case relative to the cap plate and connecting the pair of second adhered portions to each other, and a second coupled portion bent from one of the pair of second adhered portions and coupled to the second electrode terminal.

The first adhered portion may include an inserted portion connected to the first coupled portion, the inserted portion being in a space between the first uncoated regions of the at least two electrode assemblies, and a welded portion bent from the inserted portion and attached to the first uncoated regions of the at least two electrode assemblies.

The welded portion may be bent from opposite transverse sides of the inserted portion to be disposed on opposite sides of each of the first uncoated regions.

The inserted portion may be aligned with the first uncoated regions, the welded portion being parallel with each of the first uncoated regions.

The welded portion may be bent from one transverse side of the inserted portion and disposed at a same side of the first uncoated regions.

The inserted portion may be aligned with the first uncoated regions, the welded portion including two parts disposed on front surfaces of respective first uncoated regions and parallel thereto.

The inserted portion may be aligned with the first uncoated regions, the welded portion being a single unit integral with the first uncoated regions.

The first adhered portion may be bent from the first coupled portion, the first adhered portion being attached to the first uncoated regions of the at least two electrode assemblies.

The first uncoated regions of the at least two electrode assemblies may be bent, the first adhered portion being aligned with and between the bent first uncoated regions of the at least two electrode assemblies.

The first uncoated regions of the at least two electrode assemblies may be bent, the first adhered portion including a side portion at one of the uncoated regions connected to the first coupled portion to be bent, and a welded portion bent from the side portion to be attached to the first uncoated regions.

The welded portion may be integral with bent ends of the first uncoated regions.

BRIEF DESCRIPTION OF THE DRAWINGS

Features will become apparent to those of ordinary skill in the art by describing in detail exemplary embodiments with reference to the attached drawings, in which.

DETAILED DESCRIPTION

Figure 1:
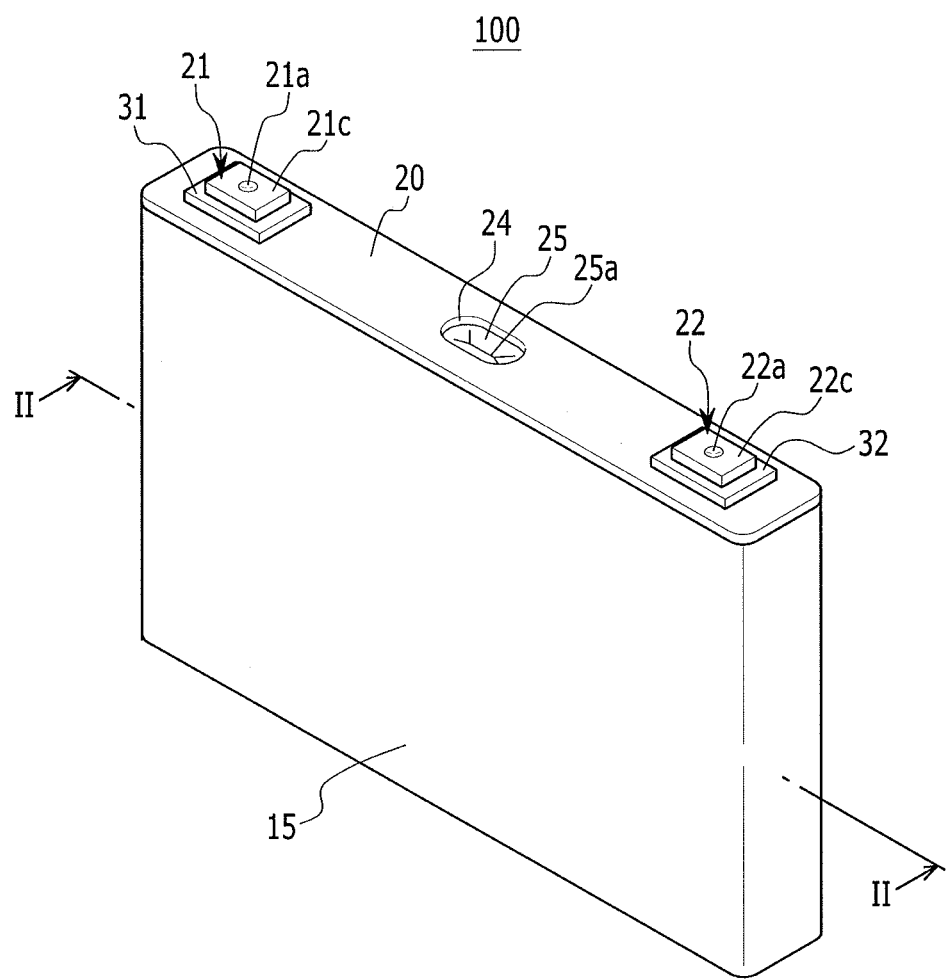
FIG. 1 illustrates a perspective view of a rechargeable battery in accordance with a first exemplary embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

Figure 2:
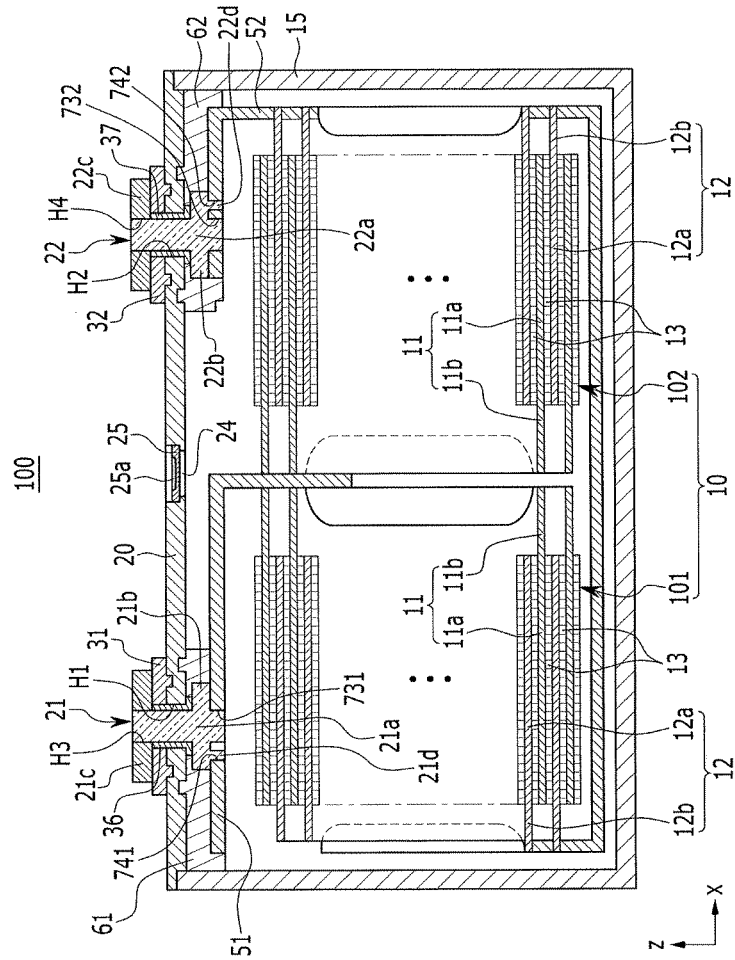
FIG. 2 illustrates a cross-sectional view taken along line II-II of FIG. 1.

FIG. 1 illustrates a perspective view of a rechargeable battery in accordance with a first exemplary embodiment, and FIG. 2 illustrates a cross-sectional view taken along line II-II of FIG. 1.

Referring to FIG. 1 and FIG. 2, a rechargeable battery 100 in accordance with the first exemplary embodiment may include an electrode assembly 10 for performing charging and discharging operations, a case 15 accommodating the electrode assembly 10 and an electrolyte therein, a cap plate 20 coupled to an opening of the case 15, electrode terminals 21 and 22 respectively installed in terminal holes H1 and H2 of the cap plate 20, and lead tabs 51 and 52 connecting the electrode terminals 21 and 22, respectively, to the electrode assembly 10.

In the first exemplary embodiment, the electrode assembly 10 may include a pair of a first electrode assembly 101 and a second electrode assembly 102. The first and second electrode assemblies 101 and 102 may be disposed along a first direction, e.g., to be adjacent to each other along the x-axis direction, in the case 15 and are connected in parallel.

Although not shown, for example, three or more electrode assemblies may be disposed in the x-axis direction and connected in parallel in the case 15. In another example, the electrode assembly 10 may include electrode assembly lines that are disposed along the x-axis direction and connected in parallel so as to fold the electrode assembly lines along a y-axis direction.

For example, each pair of first and second electrode assemblies 101 and 102 may be formed by disposing electrodes (e.g., a negative electrode 11 and a positive electrode 12) on opposite surfaces of a separator 13 serving as an insulator, and winding the negative electrode 11, the separator 13, and the positive electrode 12 in a jelly-roll shape. The negative and positive electrodes 11 and 12 include coated regions 11a and 12a formed by applying an active material to a current collector of a metal plate, and uncoated regions 11b and 12b which are exposed portions of the current collector to which the active material is not applied.

The uncoated region 11b of the negative electrode 11 is formed at one end of the negative electrode 11 along the wound negative electrode 11. The uncoated region 12b of the positive electrode 12 is formed at one end of the positive electrode 12 along the wound positive electrode 12. The first and second uncoated regions 11b and 12b are respectively disposed at opposite ends of each of the electrode assemblies 101 and 102 (also collectively referred to as the electrode assembly 10). In other words, the first and second uncoated regions 11b and 12b are respectively disposed at opposite ends of the first electrode assembly 101, and the first and second uncoated regions 11b and 12b are respectively disposed at opposite ends of the second electrode assembly 102. Further, the first uncoated regions 11b of each of the electrode assemblies 101 and 102, and the second uncoated regions 12b of each of the electrode assemblies 101 and 102 are disposed in a vertical direction, e.g., along the z-axis direction, with respect to the cap plate 20.

Between the adjacent first and second electrode assemblies 101 and 102, one pair of first uncoated regions 11b which are respectively connected to the negative electrodes 11 are disposed to face each other. That is, the first uncoated regions 11b of the first electrode assembly 101 may be arrange to face the first uncoated region 11b of the second electrode assembly 102 at the center of the case 15. As such, the first uncoated regions 11b of the first and second electrode assemblies 101 and 102 may be disposed at the center of the case 15 to be connected to the first lead tab 51. Further, the second uncoated region 12b of the first and second electrode assemblies 101 and 102 may be disposed at opposite edges, i.e., inner ends, of the case 15 to be connected to the second lead tab 52.

In other words, as one pair of first uncoated regions 11b are connected to the first lead tab 51, the first and second electrode assemblies 101 and 102 are connected in parallel. Accordingly, the rechargeable battery 100 can reduce an output decrease level and a capacity decrease level. For example, when a conductive member (not shown) is extended through the first electrode assembly 101 of the first and second electrode assemblies 101 and 102, the first electrode assembly 101 may be discharged and the second electrode assembly 102 can maintain a stable state. Accordingly, the rechargeable battery 100 can accomplish high capacity while obtaining stability. As another example, when a conductive member (not shown) is extended to a space between the first and second electrode assemblies 101 and 102, both of the first and second electrode assemblies 101 and 102 can maintain a stable state.

The case 15 may have an approximate cuboid shape in such a way so as to define an internal space thereof for housing the first and second electrode assemblies 101 and 102. An opening for connecting external and internal spaces can be formed on one side of the cuboid. The first and second electrode assemblies 101 and 102 may be inserted into the case 15 through the opening.

The cap plate 20 is installed in the opening of the case 15 to close and seal the case 15. For example, the case 15 and the cap plate 20 may be made of aluminum and be welded to each other. That is, after the first and second electrode assemblies 101 and 102 are inserted into the case 15, the cap plate 20 may be welded to the opening of the case 15.

The cap plate 20 has at least one opening therethrough, e.g., the terminal holes H1 and H2, a vent hole 24, and an electrolyte inlet (not shown). The first and second electrode terminal 21 and 22 are respectively installed at the terminal holes H1 and H2 of the cap plate 20 to be electrically connected to one pair of first and second electrode assemblies 101 and 102.

That is, the first and second electrode terminals 21 and 22 are respectively electrically connected to the negative electrode 11 and the positive electrode 12 of each of the first and second electrode assemblies 101 and 102. Accordingly, the first and second electrode assemblies 101 and 102 may be respectively drawn out of the case 15 through the electrode terminals 21 and 22.

The first and second electrode terminals 21 and 22 include respective plate terminals 21c and 22c provided on the outside of the cap plate 20, corresponding to the terminal holes H1 and H2, and respective rivet terminals 21a and 22a electrically connected to each of the first and second electrode assemblies 101 and 102 and fastened to the respective plate terminals 21c and 22c through the terminals holes H1 and H2.

The plate terminals 21c and 22c respectively have through holes H3 and H4. The rivet terminals 21a and 22a are extended through the terminal holes H1 and H2 and inserted into the through holes H3 and H4, respectively. The electrode terminals 21 and 22 further include flanges 21b and 22b, respectively, extended integrally with the rivet terminals 21a and 22a inside the cap plate 20.

At the electrode terminal 21 to be connected to the negative electrode 11, an external insulating member 31 is interposed between the plate terminal 21c and the cap plate 20, thus electrically insulating the plate terminal 21c from the cap plate 20. That is, the cap plate 20 remains electrically insulated from the electrode assembly 10 and the negative electrode 11.

The insulating member 31 and the plate terminal 21c are fastened to the upper end of the rivet terminal 21a by coupling the insulating member 31 and the plate terminal 21c to the upper end of the rivet terminal 21a and riveting or welding the upper end. The plate terminal 21c is installed at the outside of the cap plate 20, with the insulating member 31 interposed therebetween.

At the electrode terminal 22 to be connected to the positive electrode 12, a conductive top plate 32 is interposed between the plate terminal 22c and the cap plate 20, thus electrically connecting the plate terminal 22c with the cap plate 20. That is, the cap plate 20 remains electrically connected to the positive terminal 12 and the first and second electrode assemblies 101 and 102.

The top plate 32 and the plate terminal 22c are fastened to the upper end of the rivet terminal 22a by coupling the top plate 32 and the plate terminal 22c to the upper end of the rivet terminal 22a and riveting or welding the upper end. The plate terminal 22c is installed at the outside of the cap plate 20, with the top plate 32 interposed therebetween.

Gaskets 36 and 37 are disposed between the rivet terminals 21a and 22a of the electrode terminals 21 and 22 and the inner surfaces of the terminal holes H1 and H2 of the cap plate 20, to seal and electrically insulate between the rivet terminals 21a and 22a and the cap plate 20. The gaskets 36 and 37 may be mounted between the flanges 21b and 22b and the inner surface of the cap plate 20 to better seal and electrically insulate between the flanges 21b and 22b and the cap plate 20. The gaskets 36 and 37 allow the electrode terminals 21 and 22 to be installed on the cap plate 20 while preventing the electrolyte from leaking through the terminal holes H1 and H2.

The lead tabs 51 and 52 electrically connect the electrode terminals 21 and 22 to the negative and positive electrodes 11 and 12 of the first and second electrode assemblies 101 and 102. That is, the first and second lead tabs 51 and 52 are connected to the first and second uncoated region 11b and 12b of the negative and positive electrodes 11 and 12. Further, the first and second lead tabs 51 and 52 are connected to the lower ends of the rivet terminals 21a and 22a while being supported by the flanges 21b and 22b, by coupling the lead tabs 51 and 52 to the lower ends of the rivet terminals 21a and 22a to caulk the lower ends thereof.

Insulating members 61 and 62 are installed between the lead tabs 51 and 52 and the cap plate 20 to electrically insulate the lead tabs 51 and 52 from the cap plate 20. In addition, one of each of the insulating members 61 and 62 is coupled to the cap plate 20 and the other thereof surrounds the lead tabs 51 and 52, the rivet terminals 21a and 22a, and the flanges 21b and 22b, thereby stabilizing the connection structure thereof.

The vent hole 24 is closed and sealed by a vent plate 25 so as to exhaust an internal pressure of the rechargeable battery and gases generated in the rechargeable battery. When the internal pressure of the rechargeable battery reaches a predetermined value, the vent plate 25 is ruptured to open the vent hole 24. The vent plate 25 has a notch 25a for inducing the rupture.

Although it is not shown, the electrolyte inlet facilitates injection of an electrolyte solution into the case 15 after the cap plate 20 is coupled to the case 15. After the electrolyte solution is injected, the electrolyte inlet is sealed by a sealing cap.

Figure 3:
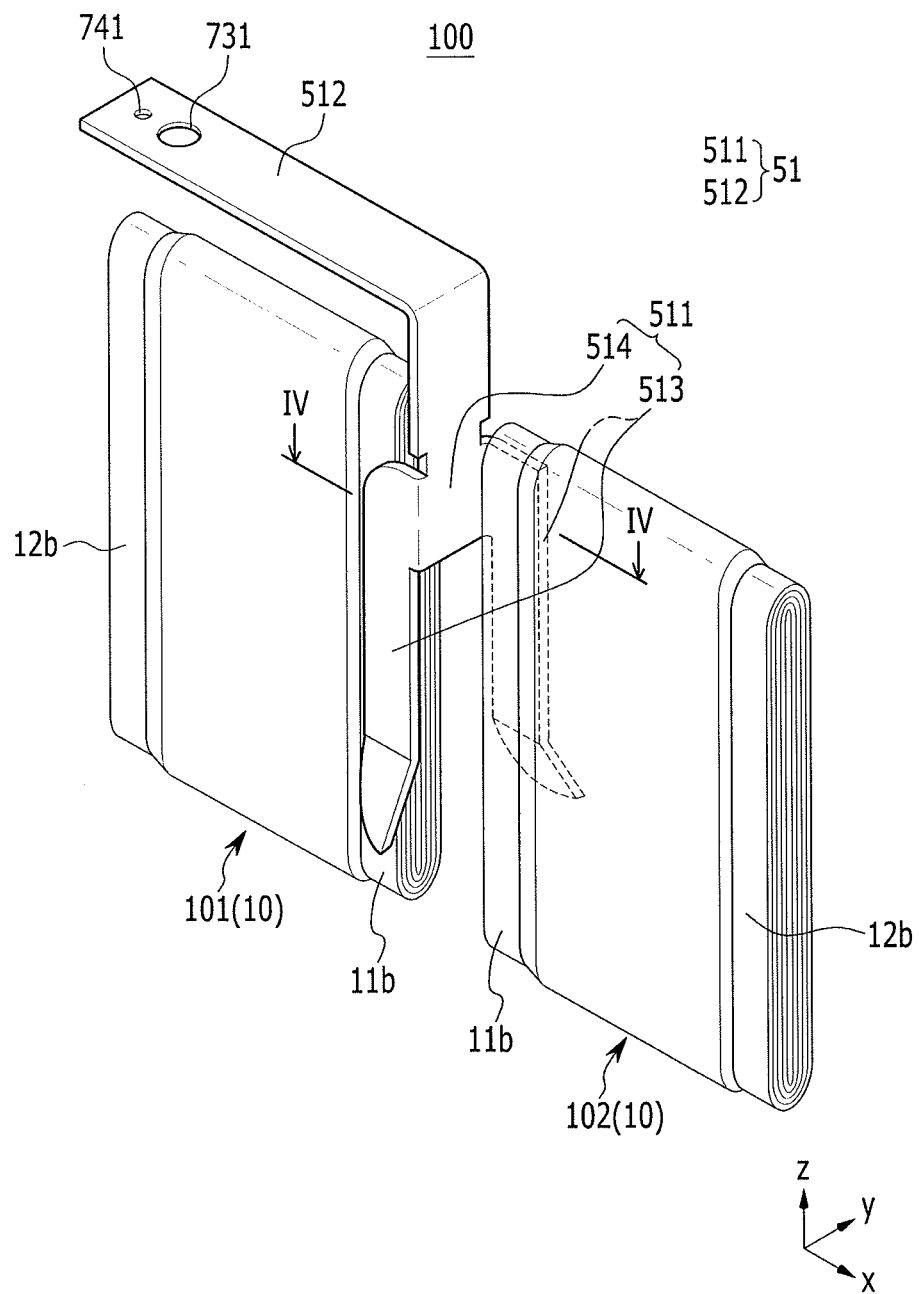
FIG. 3 illustrates a perspective view of a connection between first and second electrode assemblies and a first lead tab shown in FIG. 2.

FIG. 3 illustrates a perspective view of a connection between the first and second electrode assemblies 101 and 102 (also collectively referred to as the electrode assembly 10) and the first lead tab 51. Referring to FIG. 3, the first lead tab 51 includes a first adhered portion 511, i.e., a first attached portion 511, disposed at the center of the case 15 to be adhered to one pair of first uncoated regions 11b, and a first coupled portion 512 bent from the first adhered portion 511 in the x-axis direction with respect to the y-axis direction and coupled to the first electrode terminal 21 to be surrounded by the first insulating member 61 (FIG. 2). The first coupled portion 512 may include pass-through slots 731 and 741 so as to be coupled to a lower end of the rivet terminal 21a and a lower protrusion 21d of the flange 21b, as illustrated in FIG. 2.

In detail, as illustrated in FIG. 3, the first adhered portion 511 includes an inserted portion 514 connected to the first coupled portion 512 to be inserted into a space between the first and second electrodes assemblies 101 and 102. For example, the inserted portion 514 may be a flat portion extending along the z-axis between and overlapping outer, facing edges of the first and second electrodes assemblies 101 and 102, such that the inserted portion 514 extends between the first uncoated regions 11b of the first electrode assembly 101 and the first uncoated regions 11b of the second electrode assembly 102. For example, as illustrated in FIG. 3, the inserted portion 514 may face terminal edges of the first uncoated regions 11b of each of the first and second electrode assemblies 101 and 102.

Further, as illustrated in FIG. 3, the first adhered portion 511 includes a welded portion 513 bent from the inserted portion 514 in the x-axis direction with respect to the z-axis direction to be brought into surface-contact with the pair of first uncoated regions 11b and welded thereto. The welded portion 513 includes a first welded portion and a second welded portion bent from opposite transverse sides of the inserted portion 514 in parallel with the first uncoated regions 11b to be disposed on front and back surfaces of each of the pair of first uncoated regions 11b and welded thereto. For example, as illustrated in FIG. 3, the first welded portion of the welded portion 513 may contact a first surface of the first uncoated region 11b in the first electrode assembly 101, the second welded portion of the welded portion 513 may contact a second surface of the first uncoated region 11b in the second electrode assembly 102, and the second electrode assembly 102 may be positioned between the first and second welded portions of the welded portion 513.

Figure 4:
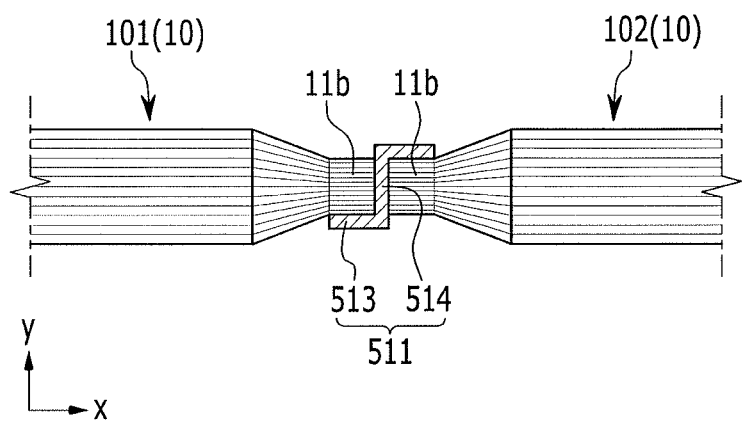
FIG. 4 illustrates a cross-sectional view taken along line IV-IV of FIG. 3.

FIG. 4 illustrates a cross-sectional view taken along line IV-IV of FIG. 3. Referring to FIG. 4, the inserted portion 514 may be disposed to be aligned with end portions of the first uncoated regions 11b of each of the first and second electrode assemblies 101 and 102, and to be adhered thereto. The welded portion 513 may be disposed on front and back surfaces of the first uncoated regions 11b of the first and second electrode assemblies 101 and 102, respectively, and welded thereto. As a result, the first adhered portion 511 and the first lead tab 51 may buffer pressure and impact that act in a disposing direction (x-axis direction) of the first and second electrode assemblies 101 and 102.

Figure 5:
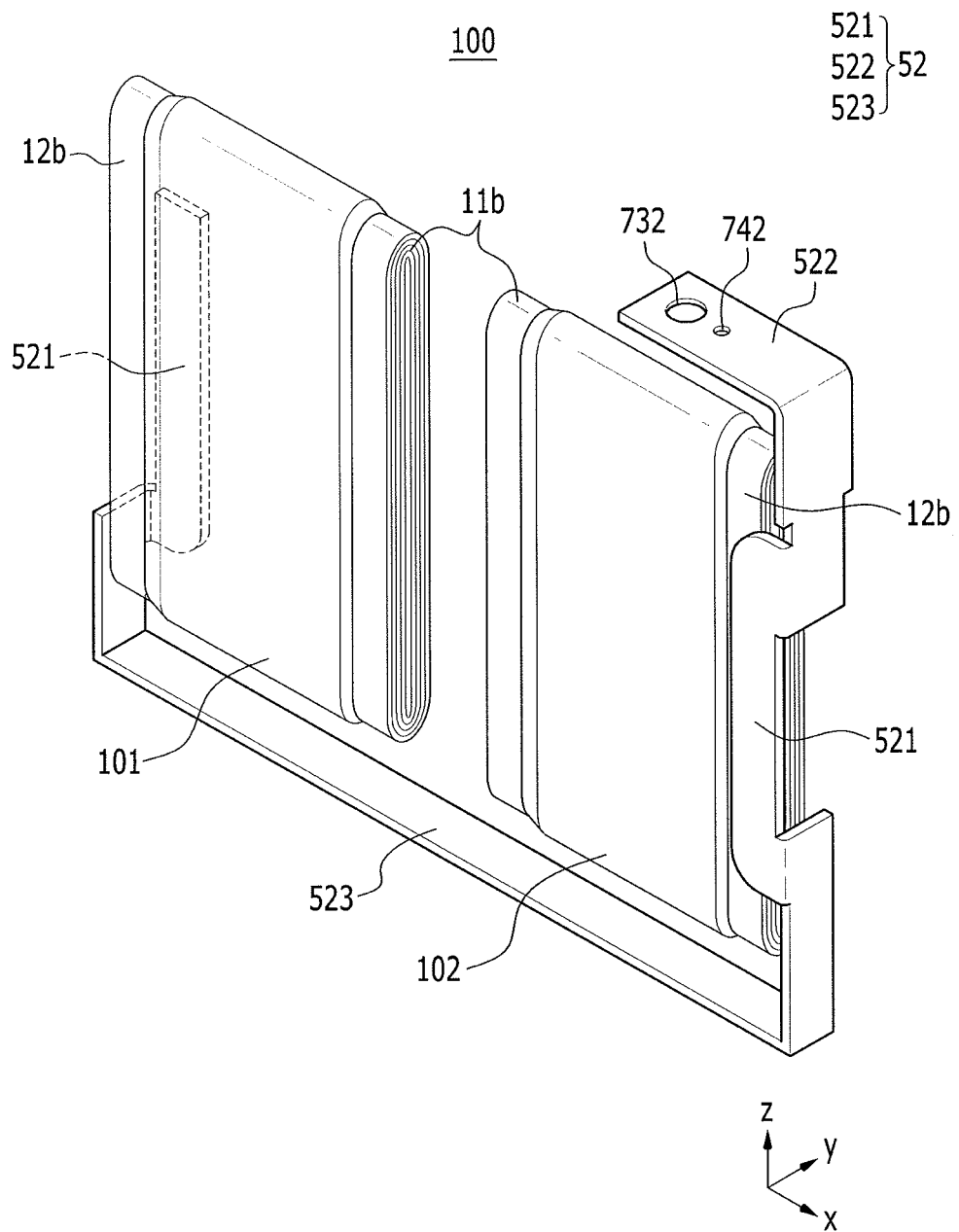
FIG. 5 illustrates a perspective view of a connection between first and second electrode assemblies and a second lead tab shown in FIG. 2.

FIG. 5 illustrates a perspective view of a connection between first and second electrode assemblies 101 and 102 and the second lead tab 52. Referring to FIG. 5, the second lead tab 52 includes a second adhered portion 521, a second coupled portion 522, and a connected portion 523 in order to connect the second uncoated regions 12b of the first and second electrode assemblies 101 and 102 to the second electrode terminal 22. The second coupled portion 522 may include pass-through slots 732 and 742 so as to be coupled to the lower end of the rivet terminal 22a and a lower protrusion 22d of the flange 22b (FIG. 2).

The second adhered portion 521 is disposed at opposite inner ends of the case 15 to be coupled to the second uncoated regions 12b. The second coupled portion 522 is bent from one of the second adhered portions 521 in the x-axis direction with respect to the z-axis to be coupled to the second electrode terminal 22. The connected portion 523 is disposed between one pair of first and second electrode assemblies 101 and 102, i.e., along bottoms of the first and second electrode assemblies 101 and 102, and along a bottom surface of the case 15 opposite to the cap plate 20.

As illustrated in FIG. 5, the connected portion 523 connects the second adhered portions 521 on opposite sides of the case 15 to each other.

In the first exemplary embodiment, as illustrated in FIG. 5, a left one of the second adhered portions 521 is disposed at a back surface of the second uncoated region 12b of the first electrodes assembly 101 and welded thereto. Further, a right one of the second adhered portions 521 is disposed at a front surface of the second uncoated region 12b of the second electrode assembly 102 and welded thereto. Although not shown, one pair of second adhered portions may be disposed at a back or front surface of one pair of second uncoated regions and welded thereto. As such, in the rechargeable battery 100, the first lead tab 51 connects one pair of the first uncoated regions 11b and the second lead tab 52 connects one pair of the second uncoated regions 12b. Accordingly, the first and second electrode assemblies 101 and 102 are connected to each other in parallel.

Hereinafter, various exemplary embodiments will be described. The same configurations as in the first exemplary embodiment and the described exemplary embodiment will be omitted, and different configurations from the first exemplary embodiment will now be described.

Figure 6:
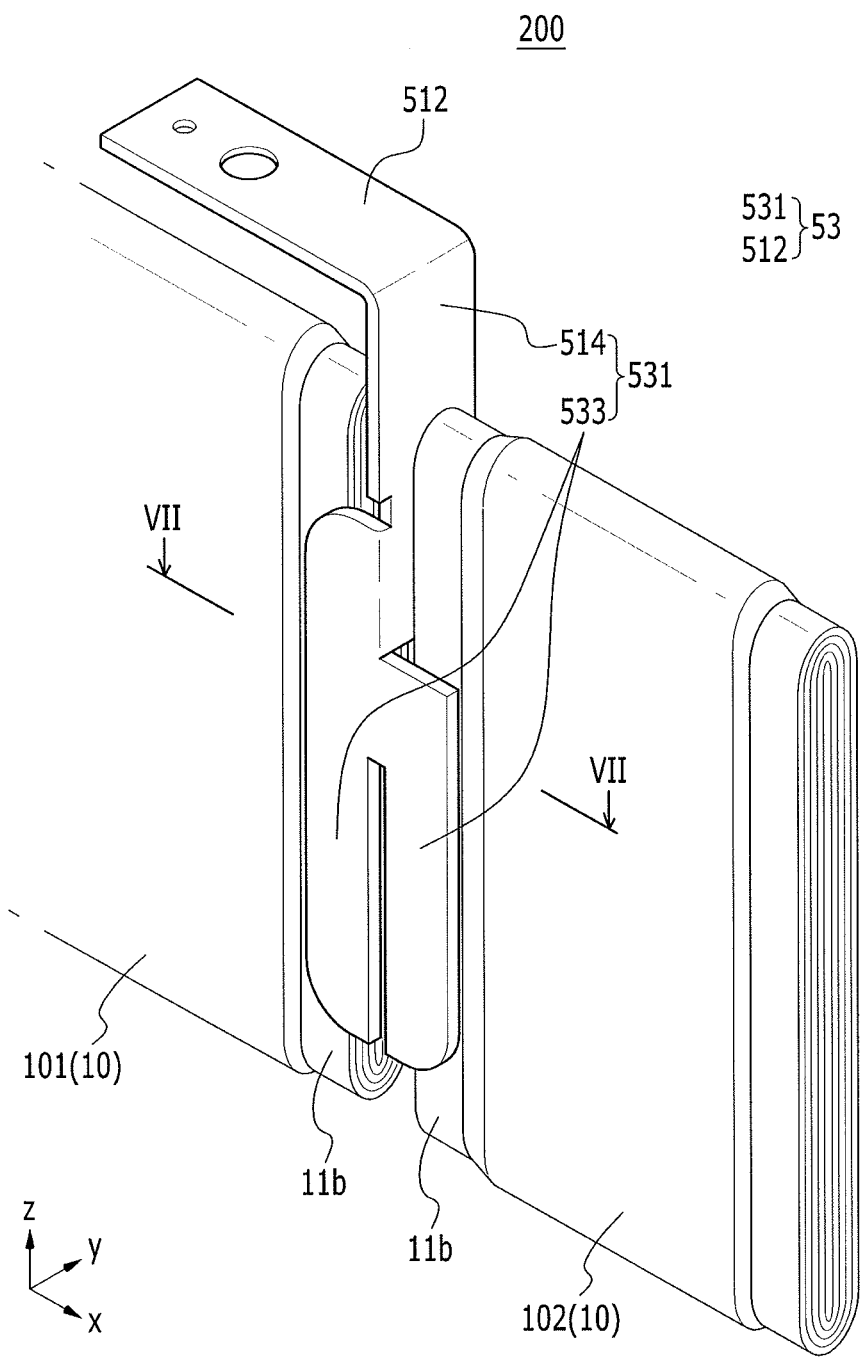
FIG. 6 illustrates a perspective view of a connection between first and second electrode assemblies and a first lead tab in a rechargeable battery in accordance with a second exemplary embodiment.
Figure 7:
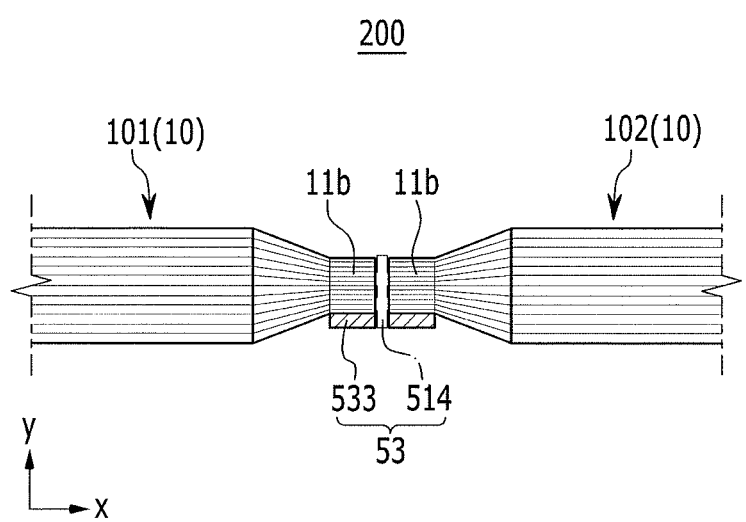
FIG. 7 illustrates a cross-sectional view taken along line VII-VII of FIG. 6.

FIG. 6 illustrates a perspective view of a connection between first and second electrode assemblies 101 and 102 and a first lead tab 53 in a rechargeable battery 200 in accordance with a second exemplary embodiment. FIG. 7 illustrates a cross-sectional view taken along line VII-VII of FIG. 6.

Referring to FIG. 6 and FIG. 7, in a first adhered portion 531 of the first lead tab 53 of the rechargeable battery 200 in accordance with the second exemplary embodiment, a welded portion 533 is bent from one transverse (y-axis directional) side (front side) of an inserted portion 514 in the x-axis direction with respect to the z-axis and disposed at the same side as one pair of first uncoated regions 11b.

The inserted portion 514 is disposed to be aligned with one end of each of the first uncoated regions 11b, and the welded portion 533 is divided into two parts to be respectively arranged on front surfaces of the first uncoated regions 11b of each of the first and second electrode assemblies 101 and 102. As illustrated in FIG. 6, the welded portion 533 is parallel to and overlaps the first uncoated regions 11b of each of the first and second electrode assemblies 101 and 102, and is welded thereto. As such, since the welded portion 533 is disposed on the front surfaces of the first uncoated regions 11b, it is easy to weld the welded portion 533 to the pair of first uncoated regions 11b.

Figure 8:
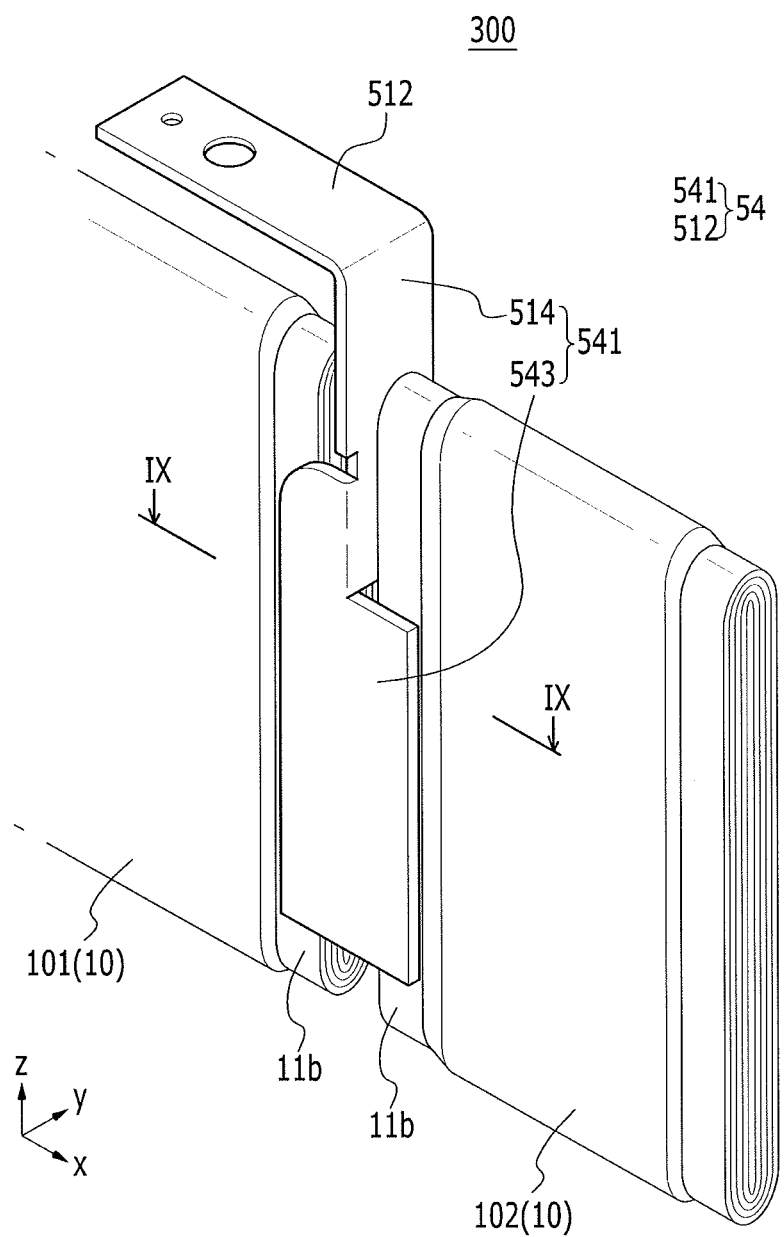
FIG. 8 illustrates a perspective view of a connection between first and second electrode assemblies and a first lead tab in a rechargeable battery in accordance with a third exemplary embodiment.
Figure 9:
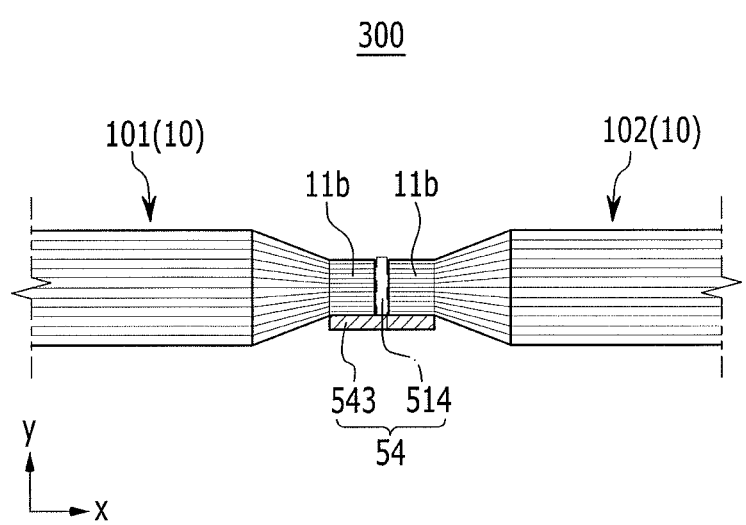
FIG. 9 illustrates a cross-sectional view taken along line IX-IX of FIG. 8.

FIG. 8 illustrates a perspective view of a connection between first and second electrode assemblies 101 and 102 and a first lead tab 54 in a rechargeable battery 300 in accordance with a third exemplary embodiment. FIG. 9 illustrates a cross-sectional view taken along line IX-IX of FIG. 8.

Referring to FIG. 8 and FIG. 9, in a first adhered portion 541 of the first lead tab 54 of the rechargeable battery 300 in accordance with the third exemplary embodiment, a welded portion 543 is bent from one transverse (y-axis directional) side (front side) of the inserted portion 514 in the x-axis direction with respect to the z-axis and disposed at the same side as the first uncoated regions 11b.

The inserted portion 514 is disposed to be aligned with one end of each of the first uncoated regions 11b, and the welded portion 543 is formed as a single unit to be disposed integrally in parallel on the first uncoated regions 11b and welded thereto. As such, since the welded portion 543 is formed as a single unit to be disposed on the front surfaces of the first uncoated regions 11b of the first and second electrode assemblies 101 and 102, it is easy to weld the welded portion 533 to the first uncoated regions 11b and it is possible to maintain a rigid state therebetween.

Figure 10:
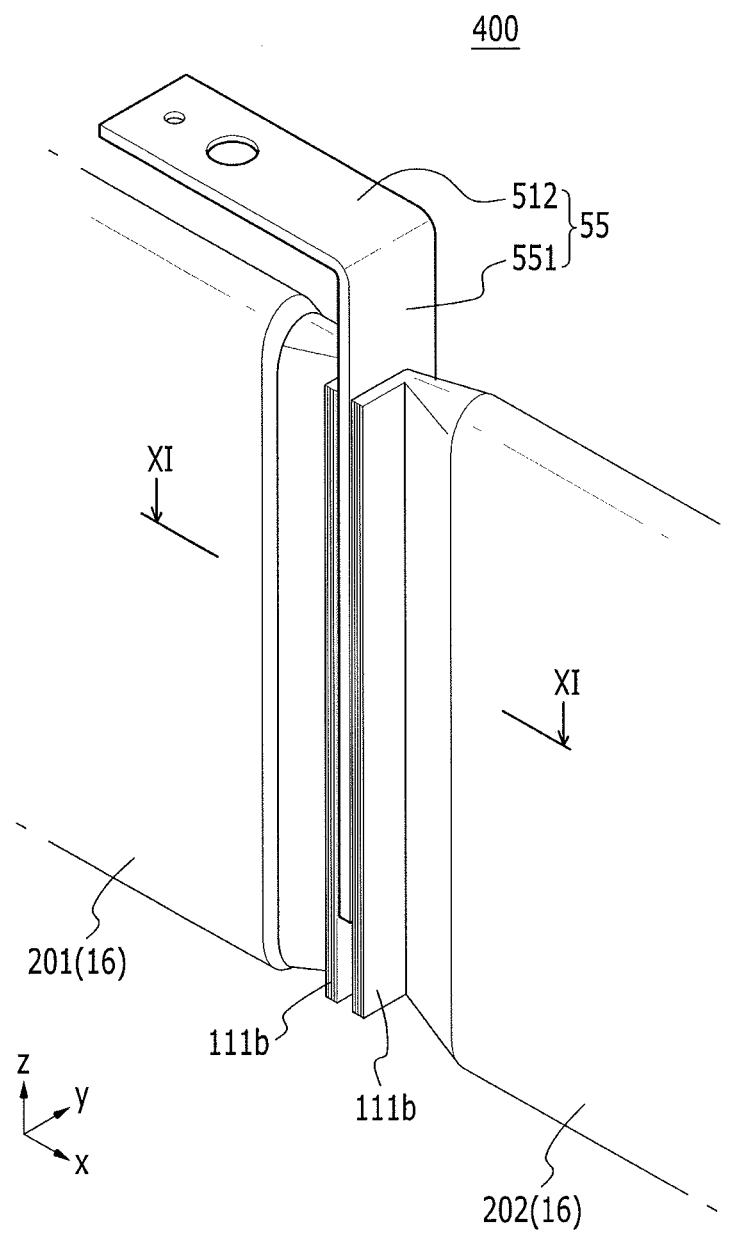
FIG. 10 illustrates a perspective view of a connection between first and second electrode assemblies and a first lead tab in a rechargeable battery in accordance with a fourth exemplary embodiment.
Figure 11:
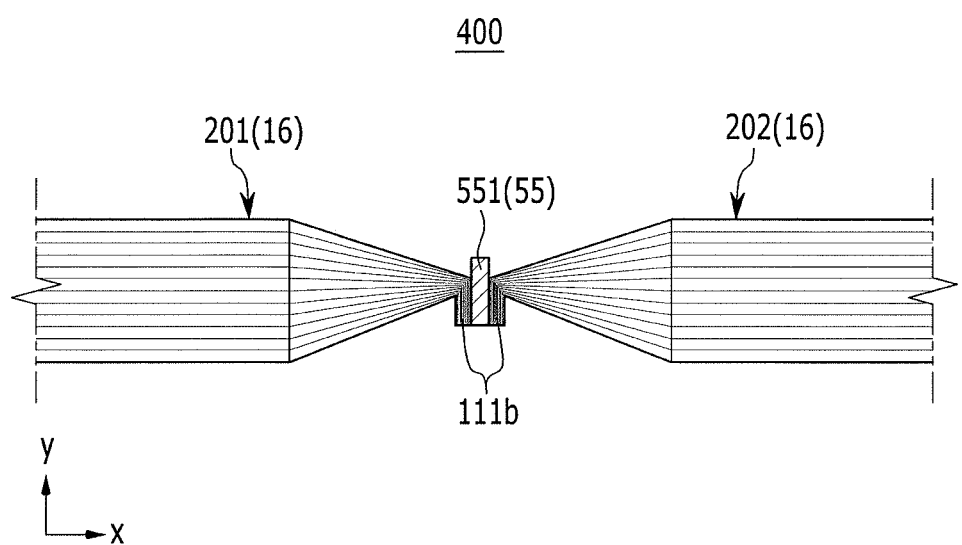
FIG. 11 illustrates a cross-sectional view taken along line XI-XI of FIG. 10.

FIG. 10 illustrates a perspective view of a connection between first and second electrode assemblies 201 and 202 (also collectively referred to as an electrode assembly 16) and a first lead tab 55 in a rechargeable battery 400 in accordance with a fourth exemplary embodiment. FIG. 11 illustrates a cross-sectional view taken along line XI-XI of FIG. 10.

Referring to FIG. 10 and FIG. 11, one pair of first uncoated regions 111b of one pair of first and second electrode assemblies 201 and 202 of a rechargeable battery 400 in accordance with the fourth exemplary embodiment are bent in the y-axis direction with respect to the z-axis. That is, as illustrated in FIGS. 10-11, the first uncoated region 111b of each one of the first and second electrode assemblies 201 and 202 is bent.

In the first lead tab 55, a first adhered portion 551 is bent from the first coupled portion 512 in the x-axis direction with respect to the y-axis, and disposed between the first uncoated regions 111b of each of the first and second electrode assemblies 201 and 202. For example, as illustrated in FIGS. 10-11, each of the first uncoated regions 111b may be bent to be positioned flush against the first adhered portion 551 and to be welded thereto. As one pair of first uncoated regions 111b are bent so that the first adhered portion 551 is disposed between the first uncoated regions 111b, the first adhered portion 551 and the first lead tab 55 can serve to effectively buffer pressure and impact that act in a disposing direction (x-axis direction) of one pair of first and second electrode assemblies 101 and 102.

Figure 12:
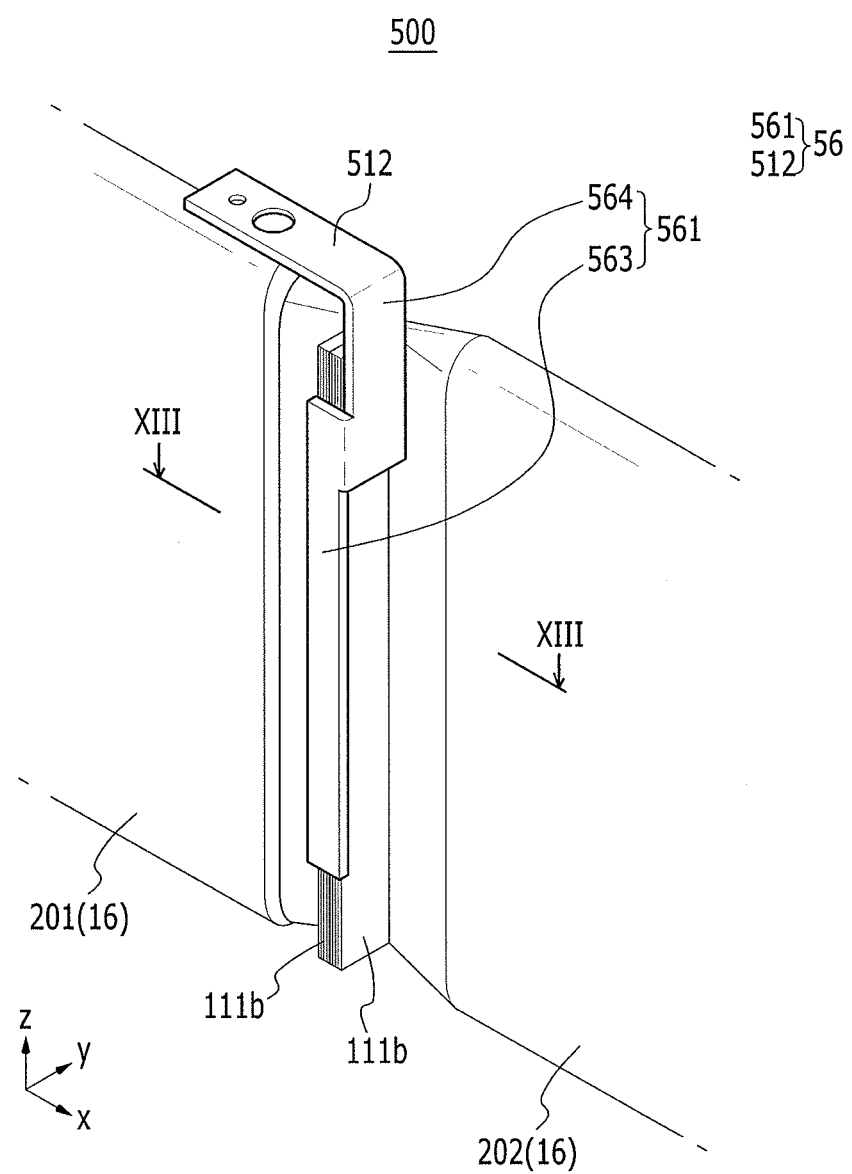
FIG. 12 illustrates a perspective view of a connection between first and second electrode assemblies and a first lead tab in a rechargeable battery in accordance with a fifth exemplary embodiment.
Figure 13:
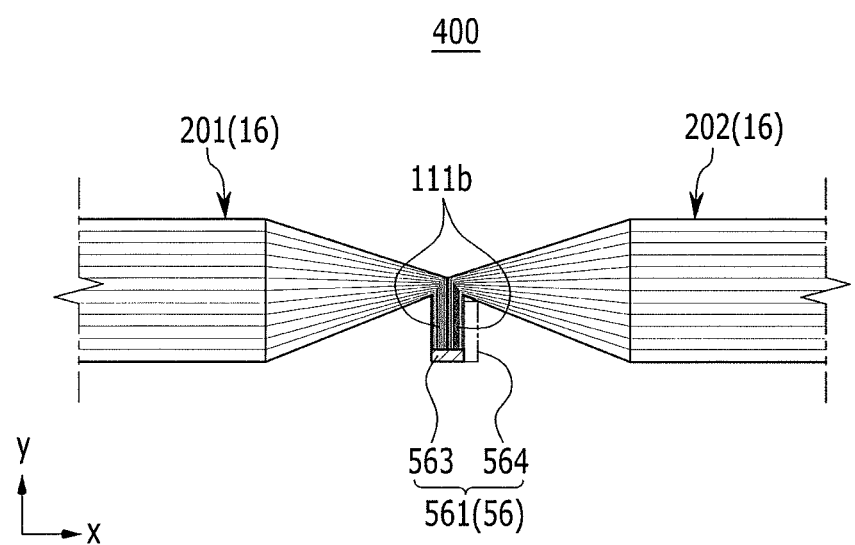
FIG. 13 illustrates a cross-sectional view taken along line XII-XII of FIG. 12.

FIG. 12 illustrates a perspective view of a connection between the first and second electrode assemblies 201 and 202, and a first lead tab 56 in a rechargeable battery in accordance with a fifth exemplary embodiment. FIG. 13 illustrates a cross-sectional view taken along line XII-XII of FIG. 12.

Referring to FIG. 12 and FIG. 13, one pair of first uncoated regions 111b of one pair of first and second electrode assemblies 201 and 202 of a rechargeable battery 500 in accordance with the fifth exemplary embodiment are bent in the y-axis direction with respect to the z-axis. In the first lead tab 56, a first adhered portion 561 includes a side portion 564 connected to the first coupled portion 512 to be disposed at one of the bent first uncoated regions 111b, and a welded portion 563 bent from the side portion 564 in the x-axis direction to be welded to one pair of the first uncoated regions 111b.

The welded portion 563 is integrally welded to the bent ends of one pair of first uncoated regions 111b. As such, since the welded portion 563 is integrally formed to be welded to the bent ends of one pair of first uncoated regions 111b, it is easy to perform the welding operation and it is possible to maintain a rigid state therebetween. Further, since one pair of first uncoated regions 111b are bent so that the side portion 564 is disposed at sides of one pair of first uncoated regions 111b, the first adhered portion 561 and the first lead tab 56 can serve to effectively buffer pressure and impact that act in a disposing direction (x-axis direction) of one pair of first and second electrode assemblies 201 and 202.

According to example embodiments, the first uncoated regions of at least one pair of electrode assemblies are connected to the first lead tab, and the second uncoated regions disposed at opposite ends thereof are connected to the second lead tab. Thus, the electrode assemblies are connected to each other in parallel. As a result, the rechargeable battery of the present exemplary embodiment can reduce an output decrease level and a capacity decrease level by connecting one pair of electrode assemblies to each other in parallel.

When a conductive member is extended through first one of the electrode assemblies, the first electrode assembly may be discharged and the other (second) electrode assembly can maintain a stable state. Accordingly, the rechargeable battery of the present exemplary embodiment can accomplish high capacity while obtaining stability. When a conductive member is extended to a space between the first and second electrode assemblies, both of the first and second electrode assemblies can maintain a stable state.

Further, according to example embodiments, the first lead tab is disposed between two electrode assemblies to be connected to respective first uncoated regions of the two electrode assemblies. Accordingly, the first lead tab can buffer pressure and impact that act in a disposing direction of the first and second electrode assemblies.

In contrast, when conventional lead tabs and uncoated regions disposed at an upper side of the case are connected to a first electrode terminal, they are disposed adjacent to a second electrode terminal. As a result, they may be short-circuited with the second electrode terminal.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A rechargeable battery, comprising:
   at least two electrode assemblies, each one of the at least two electrode assemblies including electrodes on opposite surfaces of a separator;
   a case to accommodate the at least two electrode assemblies, the at least two electrode assemblies being arranged in a length direction of the case;
   a cap plate coupled to an opening of the case;
   a first electrode terminal and a second electrode terminal installed in the cap plate; and
   a first lead tab and a second lead tab connected to the first electrode terminal and the second electrode terminal, respectively, the first and second lead tabs being connected to uncoated regions of each of the at least two electrode assemblies,
   wherein the first lead tab includes:
      a first adhered portion extending between the at least two electrode assemblies at a center of the case in the length direction of the case, and
      a first coupled portion extending from the first adhered portion at the center of the case toward one edge of opposite edges of the case, the first coupled portion extending perpendicularly to the first adhered portion in the length direction of the case and parallel to the cap plate, wherein the uncoated regions of each of the at least two electrode assemblies include a first uncoated region and a second uncoated region, wherein the first uncoated region of each of the at least two electrode assemblies is disposed at the center of the case in the length direction of the case, the first uncoated region of each of the at least two electrode assemblies facing the first adhered portion and being connected to the first lead tab, and wherein the second uncoated region of each of the at least two electrode assemblies is at a different edge of the opposite edges of the case, the second uncoated regions of the at least two electrode assemblies being connected to the second lead tab.

2. The rechargeable battery as claimed in claim 1, wherein the first adhered portion is adhered to the first uncoated region of each of the at least two electrode assemblies; and the first coupled portion is bent from the first adhered portion to be coupled to the first electrode terminal.

3. The rechargeable battery as claimed in claim 2, wherein the second lead tab includes:
- a pair of second adhered portions disposed at opposite edges of the case to be adhered to the second uncoated region of each of the at least two electrode assemblies;
- a connected portion disposed and bent between the case and each of the at least two electrode assemblies, the connected portion being at an opposite side of the case relative to the cap plate and connecting the pair of second adhered portions to each other; and
- a second coupled portion bent from one of the pair of second adhered portions and coupled to the second electrode terminal.

4. The rechargeable battery as claimed in claim 2, wherein the first adhered portion includes:
- an inserted portion connected to the first coupled portion, the inserted portion being in a space between the first uncoated regions of the at least two electrode assemblies; and
- a welded portion bent from the inserted portion and attached to the first uncoated regions of the at least two electrode assemblies.

5. The rechargeable battery as claimed in claim 4, wherein the welded portion is bent from opposite transverse sides of the inserted portion to have two parts extending in opposite directions to be disposed on opposite sides of each of the first uncoated regions.

6. The rechargeable battery as claimed in claim 5, wherein the inserted portion is aligned with the first uncoated regions, the welded portion being parallel with each of the first uncoated regions.

7. The rechargeable battery as claimed in claim 4, wherein the welded portion is bent from one transverse side of the inserted portion and disposed at a same side of the first uncoated regions.

8. The rechargeable battery as claimed in claim 7, wherein the inserted portion is aligned with the first uncoated regions, the welded portion including two parts disposed on front surfaces of respective first uncoated regions and parallel thereto.

9. The rechargeable battery as claimed in claim 7, wherein the inserted portion is aligned with the first uncoated regions, the welded portion being a single unit integral with the first uncoated regions.

10. The rechargeable battery as claimed in claim 2, wherein the first adhered portion is bent from the first coupled portion, the first adhered portion being attached to the first uncoated regions of the at least two electrode assemblies.

11. The rechargeable battery as claimed in claim 10, wherein the first uncoated regions of the at least two electrode assemblies are bent, the first adhered portion being aligned with and between the bent first uncoated regions of the at least two electrode assemblies.

12. The rechargeable battery as claimed in claim 2, wherein the first uncoated regions of the at least two electrode assemblies are bent, the first adhered portion including:
- a side portion at one of the uncoated regions connected to the first coupled portion to be bent, and
- a welded portion bent from the side portion to be attached to the first uncoated regions.

13. The rechargeable battery as claimed in claim 12, wherein the welded portion is integral with bent ends of the first uncoated regions.

14. The rechargeable battery as claimed in claim 1, wherein the second lead tab is disposed at opposite sides of the electrode assemblies relative to the first lead tab and continuously extends along sides of the electrode assemblies and along bottoms of the electrode assemblies in parallel to a bottom side of the case opposite to the cap plate.

15. The rechargeable battery as claimed in claim 1, wherein the second uncoated regions of the at least two electrode assemblies face away from each other, and are connected to the same second lead tab.

16. The rechargeable battery as claimed in claim 1, wherein the first and second lead tabs have different shapes.

17. The rechargeable battery as claimed in claim 16, wherein the second lead tab is longer than the first lead tab in the length direction of the case, the second lead tab overlapping the at least two electrode assemblies.

* * * * *